United States Patent [19]

Yamamoto

[11] Patent Number: 5,042,913
[45] Date of Patent: Aug. 27, 1991

[54] ELECTRICAL SIGNAL FORMING APPARATUS HAVING IMAGE SPLITTING PRISM

[75] Inventor: Haruhisa Yamamoto, Fujisawa, Japan

[73] Assignee: Canon Kabushiki Kaisha, Tokyo, Japan

[21] Appl. No.: 598,795

[22] Filed: Oct. 17, 1990

Related U.S. Application Data

[63] Continuation of Ser. No. 494,452, Mar. 16, 1990, abandoned.

[30] Foreign Application Priority Data

Mar. 17, 1989 [JP] Japan .................. 1-65669
Feb. 27, 1990 [JP] Japan .................. 2-47841

[51] Int. Cl.⁵ .................. G02B 27/14; H04N 9/09
[52] U.S. Cl. .................. 359/640; 359/831; 358/50
[58] Field of Search .............. 350/286, 169, 170, 172, 350/173; 358/50, 55; 228/120, 121, 122

[56] References Cited

U.S. PATENT DOCUMENTS

| | | | |
|---|---|---|---|
| 4,072,405 | 2/1978 | Ozeki | 350/173 |
| 4,268,119 | 5/1981 | Hartmann | 350/173 |
| 4,323,918 | 4/1982 | Bendell | 358/50 |
| 4,591,901 | 5/1986 | Andrevski | 358/50 |
| 4,623,916 | 11/1986 | Levine | 350/172 |
| 4,659,378 | 4/1987 | Volz et al. | 420/8 |
| 4,857,997 | 8/1989 | Fukami et al. | 358/55 |
| 4,890,899 | 1/1990 | Aoki et al. | 350/173 |
| 4,916,529 | 4/1990 | Yamamoto et al. | 358/50 |

FOREIGN PATENT DOCUMENTS

| | | |
|---|---|---|
| 54-111419 | 8/1979 | Japan . |
| 58-63279 | 4/1983 | Japan . |
| 59-39580 | 3/1984 | Japan . |
| 61-135279 | 6/1986 | Japan . |
| 63-81481 | 4/1988 | Japan . |
| 64-23186 | 1/1989 | Japan . |

*Primary Examiner*—Bruce Y. Arnold
*Assistant Examiner*—Loha Ben
*Attorney, Agent, or Firm*—Fitzpatrick, Cella, Harper & Scinto

[57] ABSTRACT

An apparatus for firmly mounting solid-state image sensors to an image splitting prism in which a mounting glass block is bonded to an image splitting prism surface or to a glass plate bonded to a prism. A metal film is formed on the glass block, and a preliminary solder layer is formed on the metal film to improve wettability. A gap between the preliminary solder layer and a meltable metal member formed on a caging of a solid-state image sensor is filled with a meltable metal having a predetermined thickness, thus bonding the preliminary solder layer and the meltable metal member. When this construction can be obtained, the total thickness of the metal film can be reduced to 1 μm or less.

25 Claims, 4 Drawing Sheets

ELECTRICAL SIGNAL FORMING APPARATUS HAVING IMAGE SPLITTING PRISM

This application is a continuation of application Ser. No. 07/494,452 filed Mar. 16, 1990, now abandoned.

BACKGROUND OF THE INVENTION:

1. Field of the Invention

The present invention relates to a video apparatus such as a color television camera and, more particularly, to an apparatus for coupling to an image splitting prism solid-state image sensors for respectively receiving component images decomposed by the image splitting prism.

2. Related Background Art

A relative positional relationship between a light exit surface of each color channel of an image splitting prism and a light-receiving surface of the corresponding solid-state image sensor must be determined in consideration of focus adjustment (optical axis) for each color channel, adjustment of inclination of the light-receiving surface to eliminate defocusing on one side of a screen, and adjustment of registration (parallel and rotational adjustment within a plane perpendicular to the optical axis) between the color channels. In a system wherein a board is mounted with an image splitting prism for allowing the above adjustment operations or each solid-state image sensor is mounted in a housing through an adjustable holding mechanism, the image pickup apparatus itself has a complicated holding mechanism. A system for directly adhering solid-state image sensors respectively to the light exit surfaces of the color channels of the image splitting prism by using a transparent adhesive is disclosed in Japanese Utility Model Laid-Open No. 54-111419. According to this system, although it is possible to perform adjustment of a position within a plane perpendicular to the optical axis and in a rotational direction, adjustment (focusing, and defocusing on one side of the screen) in the axial direction cannot be performed.

A system for achieving adjustment in the axial direction is disclosed in Japanese Patent Laid-Open No. 58-63279. According to this system, a flexible spacer is interposed between a light exit surface of an image splitting prism and an edge portion of a solid-state image sensor and an adhesive is applied to side surfaces of the spacer to maintain a flexibly deformed state upon hardening of an adhesive. When a linear expansion coefficient of an adhesive is large, a focusing error is not negligible when a solid-state image sensor having a large focusing error caused by a change in humidity and a high resolution is used. According to this system, focusing and registration errors are increased due to deterioration over time since a thick adhesive layer is formed. It is possible to adhere a metal mounting piece to an image splitting prism and hold the solid-state image sensor by this metal mounting piece. When an abrupt change in temperature occurs, however, a large difference between the linear expansion coefficient of the material of the image splitting prism and that of the mounting piece causes a large force to act on the prism, thereby damaging the prism. It is also difficult to remove dust when it is attached to a corner at which the mounting piece is adhered to the prism surface.

When one of the solid-state image sensors has failed, the failed element must be removed from the image splitting prism and replaced with a new one. When the failed element is removed from the prism, the surface of the image splitting prism may often be damaged.

In Japanese Utility Model Laid-Open No. 59-39580, a column is mounted on an exit surface of an image splitting prism, and the column is soldered to a mounting piece for holding a solid-state image sensor as in bonding of electrical components. Bonding by soldering is suitable for removal of a solid-state image sensor.

In Japanese Patent Laid-Open No 61-135279, support members each having an opening are respectively adhered to exit surfaces of a color separation prism. A plurality of legs of this support member are soldered to legs of the mounting piece.

During assembly, however, it is difficult to remove small dust from a portion where an edge of the opening of the support member contacts the prism. Residual dust causes scattering of light during an image pickup operation, thereby degrading image quality. Other various problems caused by adhesion of metallic members to the prism using an adhesive are also posed.

Other conventional devices in which solid-state image sensors are coupled to image splitting prism are known in U.S. Pat. Nos. 4,268,119, 4,323,918, 4,591,901, and 4,623,916.

The assignee of the present applicant has proposed Japanese Utility Model Laid-Open No. 63-81481 (U.S. Ser. No. 119,093) and Japanese Utility Model Laid-Open No. 1-23186. In these proposals, in order to overcome the above-noted problems, a coating layer consisting of a special-purpose solder is formed on a glass block, and a normal solder is used to fill a gap between the coating layer and a holding tool for holding the solid-state image sensor, thereby bonding the glass block and the holding tool. When a product is manufactured by this method, however, the thickness of the solder layer is excessively large so as to degrade its strength. In order to prevent this, the special-purpose solder layer is cut to have a very small thickness and is then soldered to the holding tool. In this case, the thickness of the solder layer requires high precision, and the soldering operation is cumbersome. In addition, when the solid-state image sensor is repeatedly adhered to or removed from the holding tool through the solder layer, and particularly when the special-purpose solder layer is repeatedly heated, the adhesion strength between the glass block and the solder layer is often weakened. Skills are required to apply a special-purpose solder to glass to obtain a desired shape while an ultrasonic wave is being applied to the solder. A device having a solder layer directly formed on a glass block is disclosed in U.S. Pat. No. 4,659,378.

Japanese Utility Model Laid-Open No. 63-81481 discloses a metallization method in addition to the method of forming a coating layer as a special-purpose solder layer.

SUMMARY OF THE INVENTION:

It is a first object of the present invention to provide an apparatus for firmly mounting solid-state image sensors to an image splitting prism without requiring a complicated mounting structure.

It is a second object of the present invention to eliminate the conventional drawbacks and to provide an arrangement suitably applied to an apparatus when a coating layer is formed by the metallization method described above.

In order to achieve the above objects of the present invention, a mounting glass block is bonded to an image splitting prism surface or to a glass plate bonded to a prism, a metal film is formed on the glass block, and a preliminary solder layer is formed on the metal film to improve wettability. A gap between the preliminary solder layer and a meltable metal member formed on a encaging of a solid-state image sensor is filled with a meltable metal having a predetermined thickness, thus bonding the preliminary solder layer and the meltable metal member. When this construction can be obtained, the total thickness of the metal film can be reduced to 1 μm or less. In particular, when a thin preliminary solder layer is formed by deposition, the thickness of the solder layer itself can be reduced to about 0.3 μm or less (0.1 to 0.5 μm).

DETAILED DESCRIPTION OF THE PREFERRED EMBODIMENTS:

The first embodiment which exemplifies a color television camera which employs the present invention will be described in detail with reference to FIGS. 1 to 3. This embodiment comprises an image splitting prism 1 constituted by component prisms 1a, 1b, and 1c. Dichroic mirrors (not shown) are formed between all the adjacent component prisms 1a, 1b, and 1c. An arrangement of an image splitting prism for splitting an image of an object into three primary color images is known to those skilled in the art, and a detailed description thereof will be omitted. A beam L emerges from a photographic lens 11 illustrated in FIG. 1 Color trimming filters 2 are respectively adhered to exit surfaces of the image splitting prism 1. In this embodiment, an area type solid-state image sensor 3 is used. A mounting glass plate 4 has a linear expansion coefficient close to or equal to that of the image splitting prism 1 or the trimming filter 2. In this embodiment, the mounting glass plate 4 is adhered to the upper surface of the trimming filter 2. No member need be adhered to the trimming filter 2. Alternatively, if the trimming filter is replaced with a multi-layered interference thin film deposited on the exit surface of the prism, the mounting glass plate may be directly adhered to the exit surface of the prism. In this embodiment, the mounting glass plate 4 extends from the wall surface of the image splitting prism 1 due to a reason to be described later. This embodiment employs a three-image splitting prism. However, a two-image splitting prism may be used to obtain the same effect as in this embodiment.

Figure 2:
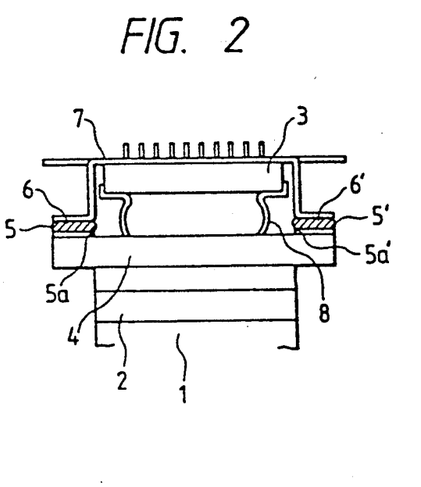
FIG. 2 is a sectional view showing a main part of the embodiment shown in FIG. 1.
Figure 3:
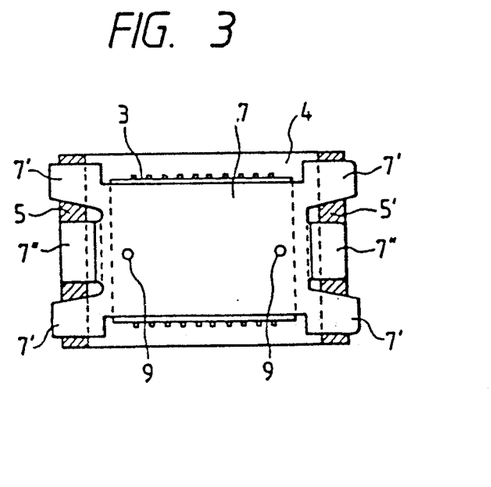
FIG. 3 is a front view showing the main part of the embodiment shown in FIG. 1.

FIG. 2 shows a main part of a bonding area as one of the exit surfaces of the image splitting prism 1. This main part is viewed from the top in FIG. 3. Bonding area 5 and 5' are constituted by metal films each containing a solder layer deposited on the mounting glass plate 4. Edges 5a and 5a' of the bonding areas 5 and 5' are preferably entirely or mostly fitted within the portions extending from the wall surfaces of the image splitting prism 1 due to the following reason. Since an interface of the metal film formed on the mounting glass plate has reflection characteristics, incidence of peripheral light components of a valid photographic beam on the interface and their reflection cause further reflection resulting in flare and ghosts. It is wasteful to prepare a large image splitting prism so as to form a large gap in the photographic optical path because the cost is undesirably increased and the resultant apparatus becomes bulky.

A mounting frame 7 is made of a low-melting metal such as a metal which can be bonded with a normal solder. Four legs 7' extend from the mounting frame 7. These legs are conveniently gripped by a position adjusting tool during assembly. The solid-state image sensor 3 is connected in the mounting frame by screws 9. Two ears 7" extend from the mounting frame 7 and are bonded to the metal films 5 and 5' through soldering layers 6 and 6' which fill the gaps, respectively.

A dustproof frame 8 has a hole for allowing transmission of a photographic beam therethrough and is made of a flexible material such as sponge rubber. The dustproof frame 8 is inserted between the mounting frame 7 and the mounting glass plate 4.

A method of forming a metal film will be described below.

In this embodiment, each metal film has a four-layered structure. The mounting glass plate is used as a substrate and a mask having an opening corresponding to the shape of the bonding area is used. Chromium (Cr) is deposited to form a first layer on the substrate, and a vapor mixture of two elements, i.e., chromium and nickel (Ni) is deposited on the first layer to form a second layer. Nickel is deposited on the second layer to form a third layer. The first to third layers are formed while the substrate is heated at 250° C. The substrate temperature is reduced to 70° C., and a solder is deposited on the third layer to form a fourth layer.

The film thickness may be changed depending on different applications. However, a total film thickness falls within the range of about 0.2 μm to 0.9 μm. It is possible to form the fourth solder layer having a small thickness. However, deposition is the best method of obtaining good results.

An operation for bonding the solid-state image sensor to the image splitting prism through the solder layer 6 will be described below. An adjustment pattern is photographed through a photographic lens to form an adjustment pattern at a position away from an exit surface of the image splitting prism 1 by a predetermined distance. The legs 7' of the mounting frame are held by a position adjustment tool (not shown), and the tool is adjusted such that a light-receiving surface of the solid-state image sensor is aligned with the adjustment pattern image. At this time, an axial position, a position in a direction perpendicular to the axial position, rotation, and inclination ar corrected while the adjustment pattern is monitored upon input of a video signal from the solid-state image sensor to a television monitor, thereby obtaining a good adjustment pattern. A slider is melted by a heater such as a soldering iron, a lamp, or a laser to bond the metal films 5 and 5' on the mounting glass 4 to the ears 7" of the mounting frame so as to fill the gap between them with the solder layers 6 and 6'. Therefore, the solid-state image sensor 3 is bonded to the image splitting prism 1.

Figure 4:
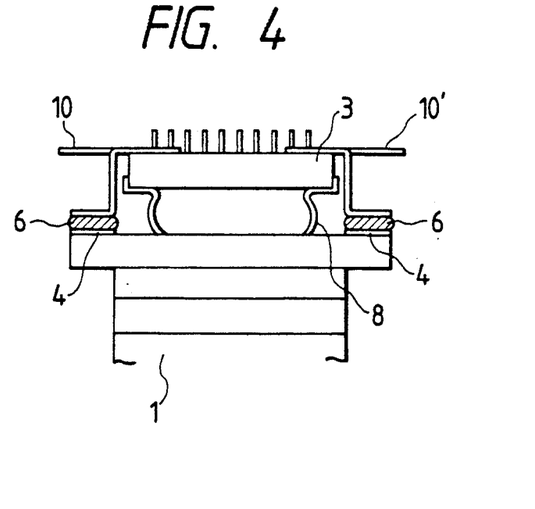
FIG. 4 is a side view of a main part of a modification according to the present invention.
Figure 5A:
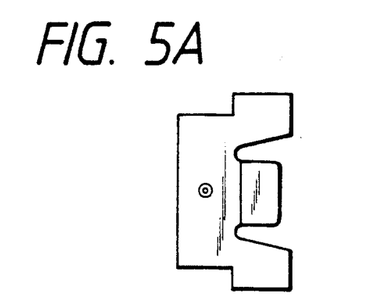
FIGS. 5A and 5B are a plan view and a sectional view, respectively, of a constituting member of the FIG. 1 embodiment.
Figure 5B:
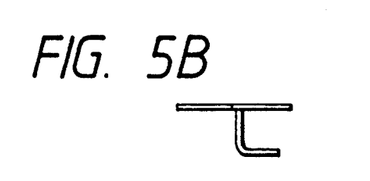

FIG. 4 shows an arrangement wherein two mounting metal pieces 10 and 10' (FIGS. 5A and 5B) are used in place of the mounting frame 7, and solid-state image sensors 3 are directly mounted on the mounting metal pieces 10 and 10' by screws.

These arrangements allow direct mechanical mounting of the solid-state image sensors to the mounting frames. Therefore, a failed solid-state image sensor can be easily replaced with a new one.

Alternatively, a large casing for solid-state image sensors may be prepared in place of the mounting frame, and the metal films may be respectively formed at both end portions of the casing. In this case, the metal films can be bonded to the metal layers on the mounting glass plate through solder layers.

In the above embodiment, the metal films are formed on the light exit surface of the prism, but the present invention is not limited to this.

Figure 6:
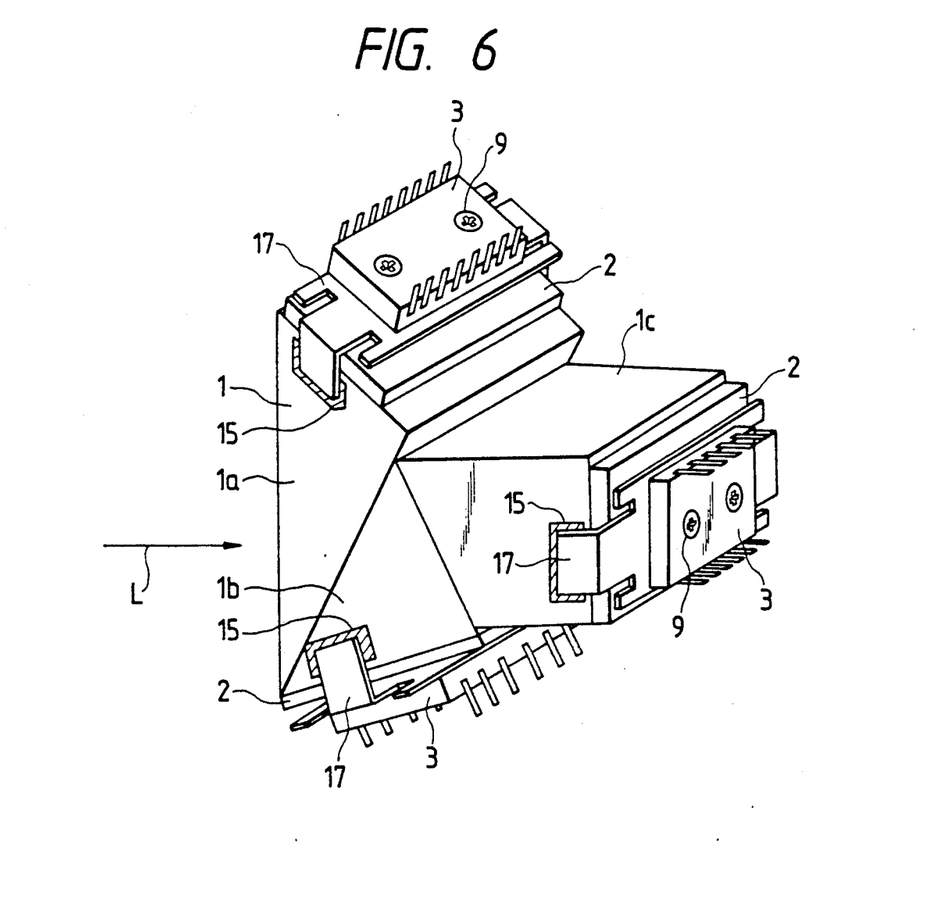
FIG. 6 is a perspective view showing another embodiment of the present invention.

FIG. 6 shows another embodiment wherein metal films are formed on surfaces except for the light exit surfaces of an image splitting prism. The image splitting prism of this embodiment is the same as that of FIG. 1 except for the following points. The shape of a mounting frame 17 is different from that of the mounting frame 7 in FIG. 1 and be mounted on the side surfaces of the image splitting prism. Bonding areas 15 are formed on the side surfaces of the image splitting prism, respectively. Each solid-state image sensor 3 is mounted on the outer surface of the mounting frame 17 by screws.

Figure 7:
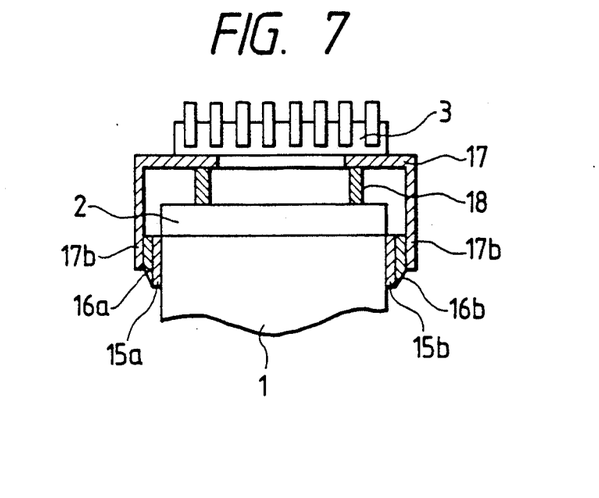
FIG. 7 is a sectional view showing a main part of the embodiment shown in FIG. 6.

Bonding layers 15a and 15b shown in FIG. 7 respectively contain solder layers deposited on the side surfaces of the image splitting prism 1. Solder layers 16a and 16b are bonded to the bonding layers 15a and 15b, respectively. A solder bonding member 17 can be mounted on solid-state image sensor 3 through solder layers. In this embodiment, the solder bonding member 17 is a mounting frame made of a metal which can be soldered to the solid-state image sensor. Metal layers may be directly formed on the casing.

Figure 8:
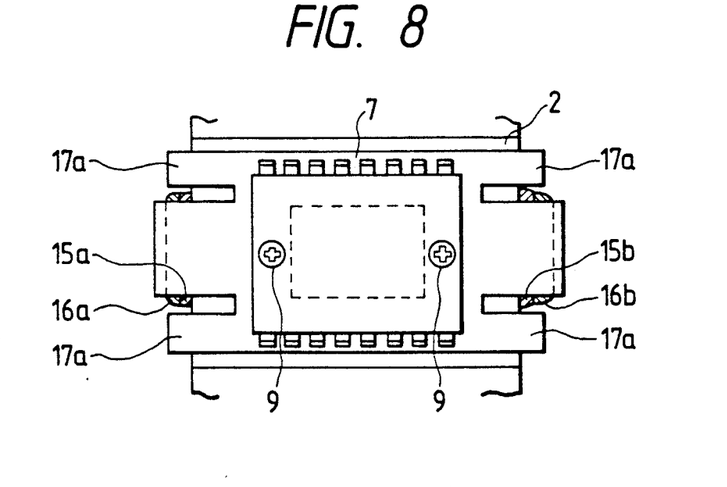
FIG. 8 is a front view showing the main part of the embodiment shown in FIG. 6.

The mounting frame 17 has an opening through which a photographic beam passes, as indicated in FIG. 8. Four legs 17a extend from the mounting frame 17 and are suitably gripped by a position adjustment tool during assembly. Each solid-state image sensor 3 is connected to the mounting frame 17 by screws 9. Two ears 17b extend from the mounting frame 17, as shown in FIG. 7. These ears 17b are bonded to the metal films 15a and 15b through solder layers 16a and 16b by the method described above so as to fill the gaps with solder.

A dustproof frame 18 has a hole through which a photographic beam passes, and is made of a flexible material such as sponge rubber. The dustproof frame 18 is fitted between the mounting frame 17 and the filter 2.

Figure 9:
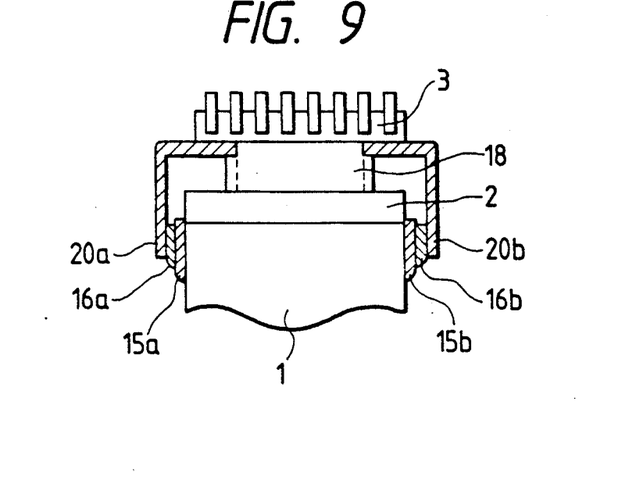
FIG. 9 is a sectional view showing a main part of another modification according to the present invention.
Figure 10:
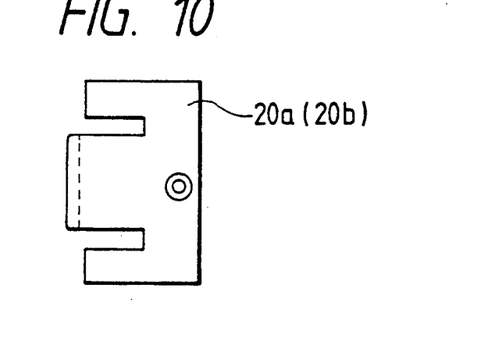
FIG. 10 is a plan view showing a constituting member of the modification shown in FIG. 9.
Figure 11:
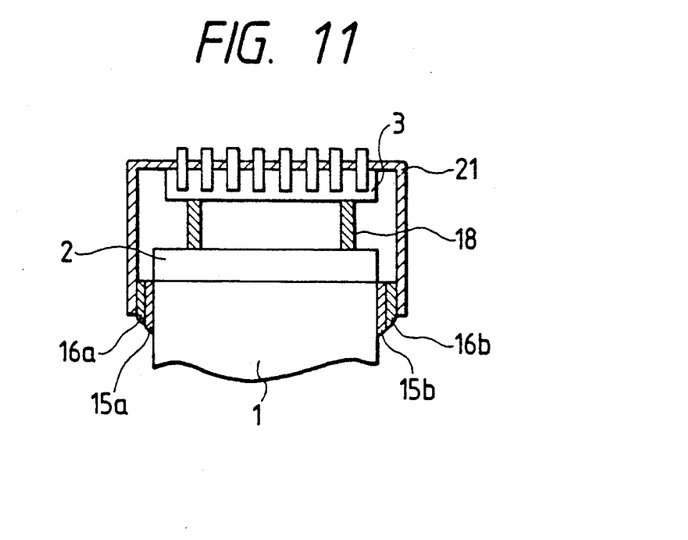
FIG. 11 is a sectional view showing a main part of still another modification according to the present invention.

FIGS. 9 and 11 are schematic views showing the main parts of modifications according to the present invention. In the modification of FIG. 9, the solder bonding member is constituted by two mounting metal pieces 20a and 20b (FIG. 10) in the modification shown in FIG. 9. The solid-state image sensors 3 are mounted on the mounting metal pieces 20a and 20b.

This modification allows direct mechanical mounting of the solid-state image sensors to the mounting frame, and the failed solid-state image sensor can be easily replaced with a new one.

Figure 12:
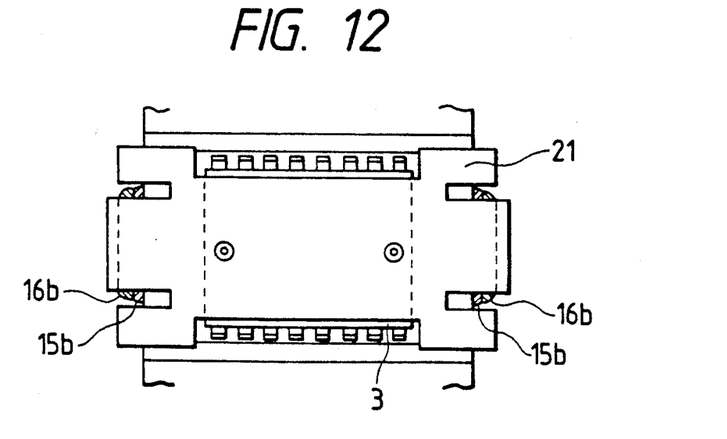
FIG. 12 is a plan view of the modification shown in FIG. 11.

In the modification shown in FIG. 11, a mounting frame 21 is mounted on a surface opposite to a light incident surface of the solid-state image sensor 3. FIG. 12 is a top view of the main part shown in FIG. 11.

This modification is effective when a space between the mounting frame 21 and the solid-state image sensor 3 is limited. Since the opening need not be formed in the mounting frame 21, the shape of the mounting frame can be simplified, and the mechanical strength and precision can be improved.

The present invention is exemplified by a color television camera, but can apply a color film image to an apparatus for converting it into a video signal. In this case, a solid-state image sensor array consists of a one-dimensional array. The present invention is also applicable to an arrangement wherein solid-state image sensors are mounted on an image splitting prism having an opaque layer in addition to the image splitting prism for splitting an image of an object into primary color images. In this case, the resultant apparatus can be used for not only visible light but also invisible light.

According to the present invention, the thickness of the low-melting metal layer used to bond the splitting prism and the solid-state image sensors can be easily set not to degrade the strength of the apparatus. The bonding area can be easily formed into a desired shape.

Since a meltable metal such as a solder can be used to bond the solid-state image sensors to the image splitting prism, the solder hardening time is short and any other force is not applied to the bonded portion during bonding, thus eliminating assembly errors. In addition, deterioration over time is less than bonding using an adhesive. Changes in position against changes in atmosphere and external mechanical forces can be reduced. The bonding areas on the image splitting prism are particularly strengthened, and image quality is not adversely affected. Since focusing, registration, and inclination can be properly adjusted, image quality can be greatly improved.

What is claimed is:

1. An apparatus for forming electrical signals upon reception of light beams, comprising:
    a prism assembly, having a plurality of light exit surfaces, for splitting incident light into a plurality of light components;
    a plurality of solid-state image sensors for respective photo-electric conversions of said light components, provided respectively with adhering parts comprising a material allowing adhesion by fusion of a low-melting metal; and
    bonding areas formed on one of said prism assembly and optical components of a glass adhered thereto, solder layers being disposed adjacent said bonding areas, low-melting metal layers filling gaps between said bonding areas and said solder layers, thereby bonding said bonding areas to said solder layers, and each of said bonding areas comprising a lower deposition metal layer and an upper metal layer to be bonded to said low-melting metal.

2. An apparatus according to claim 1, wherein said upper metal layer is deposition-formed.

3. An apparatus according to claim 2, wherein said upper metal layer essentially comprises a solder.

4. An apparatus according to claim 3, wherein a thickness of said upper metal layer falls within a range of 0.1 to 0.5 μm.

5. An apparatus according to claim 1, wherein said lower metal layer comprises a plurality of sublayers.

6. An apparatus according to claim 5, wherein a first sublayer of said plurality of sublayers comprises a chromium deposition layer, a second sublayer thereof comprises a two-element deposition layer of chromium and nickel, and a third sublayer thereof comprises a nickel deposition layer.

7. An apparatus according to claim 1, wherein said prism assembly includes a dichroic layer.

8. An apparatus according to claim 1, wherein said prism assembly includes an opaque layer.

9. An apparatus according to claim 1, wherein said solid-state image sensor comprises an area type sensor.

10. An apparatus according to claim 1, wherein said solid-state image sensor comprises a linear type sensor.

11. An image splitting prism apparatus for splitting a light beam from an object and passing through a photographic lens into light components so as to cause the light components to be respectively incident on a plurality of solid-state image sensors, comprising:

a prism assembly having one light incident surface and a plurality of light exit surfaces;

a pair of bonding areas formed on each of said light exit surfaces or a glass plate adhered to said each light exit surface to bond a corresponding one of said solid-state image sensors, each of said bonding areas comprising a plurality of deposition layers stacked on each other, said plurality of deposition layers including an uppermost layer comprising a solder layer.

12. An apparatus according to claim 11, wherein said solder layer has a thickness falling within a range of 0.1 to 0.5 μm.

13. An image splitting prism apparatus for splitting a light beam from an object and passing through a photographic lens into light components so as to cause the light components to be respectively incident on a plurality of solid-state image sensors, comprising:

a prism assembly having one light incident surface and a plurality of light exit surfaces;

a pair of bonding areas formed on side surfaces of said prism assembly in units of image sensors to bond a corresponding one of said solid-state image sensors to said prism assembly, each of said bonding areas comprising a plurality of deposition layers stacked on each other, said plurality of deposition layers including an uppermost layer comprising a solder layer.

14. An apparatus according to claim 13, wherein said solder layer has a thickness falling within a range of 0.1 to 0.5 μm.

15. An apparatus for forming electrical signals upon reception of an incident light beam, comprising:

a light splitting member, having a plurality of light exit surfaces, for splitting incident light into a plurality of light components;

a plurality of photo-sensing elements for receiving said light components and generating electrical signals from said light components;

a plurality of supporting members for respectively supporting said photo-sensing elements;

a bonding member having a deposition-formed lower metal layer on said light splitting member, and an upper metal layer meltable with a low-temperature melting metal; and a plurality of low-temperature melting metal layers for connecting said light splitting member and said supporting members to align said photo-sensing elements with said light exit surfaces.

16. An apparatus according to claim 15, wherein said supporting member comprises a plurality of legs.

17. An apparatus according to claim 16, wherein said supporting member includes a portion for supporting back surfaces of said photo-sensing elements and said plurality of legs.

18. An apparatus according to claim 15, wherein said supporting member comprises two portions each having a plurality of legs.

19. An apparatus according to claim 15, wherein said light splitting member comprises an image splitting prism having dichroic layers to which transparent plates are adhered.

20. An apparatus according to claim 19, wherein said transparent plates protrude from both sides of said image splitting prism.

21. An apparatus according to claim 15, wherein said upper metal layer is deposition formed.

22. An apparatus according to claim 21, wherein said upper metal layer comprises a solder.

23. An apparatus according to claim 22, wherein a thickness of said upper metal layer falls within a range of substantially 0.1 to 0.5 μm.

24. An apparatus according to claim 15, wherein said lower metal layer comprises a plurality of sublayers.

25. An apparatus according to claim 24, wherein a first sublayer of said plurality of sublayers comprises a chromium deposition layer, a second sublayer thereof comprises a two-element deposition layer of chromium and nickel, and a third sublayer thereof comprises a nickel deposition layer.

* * * * *

UNITED STATES PATENT AND TRADEMARK OFFICE
CERTIFICATE OF CORRECTION

PATENT NO. : 5,042,913

DATED : August 27, 1991

INVENTOR(S) : Haruhisa Yamamoto

It is certified that error appears in the above-identified patent and that said Letters Patent is hereby corrected as shown below:

ON THE TITLE PAGE,

[56] References Cited:

"64-23186" should read --1-23186--.

COLUMN 2:

Line 25, "applicant" should read --application--.

Figure 1:
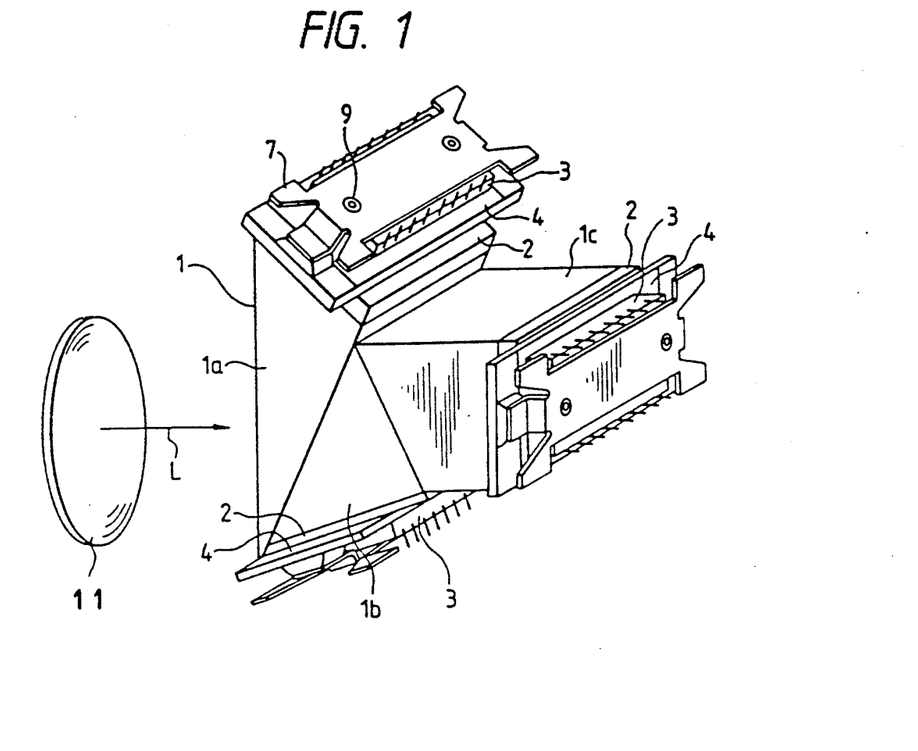
FIG. 1 is a perspective view showing an embodiment of the present invention.

COLUMN 3:

Line 58, "FIG. 1 Color" should read --FIG. 1. Color--.

COLUMN 5:

Line 39, "be mounted" should read --may be mounted--.

COLUMN 7:

Line 31, "alight" should read --a light--.

UNITED STATES PATENT AND TRADEMARK OFFICE
CERTIFICATE OF CORRECTION

PATENT NO. : 5,042,913

DATED : August 27, 1991

INVENTOR(S) : Haruhisa Yamamoto

It is certified that error appears in the above-identified patent and that said Letters Patent is hereby corrected as shown below:

<u>COLUMN 8</u>:

Line 44, "deposition formed." should read --deposition-formed.--.

Signed and Sealed this

Sixteenth Day of March, 1993

Attest:

STEPHEN G. KUNIN

*Attesting Officer*  *Acting Commissioner of Patents and Trademarks*